Patented Aug. 21, 1934

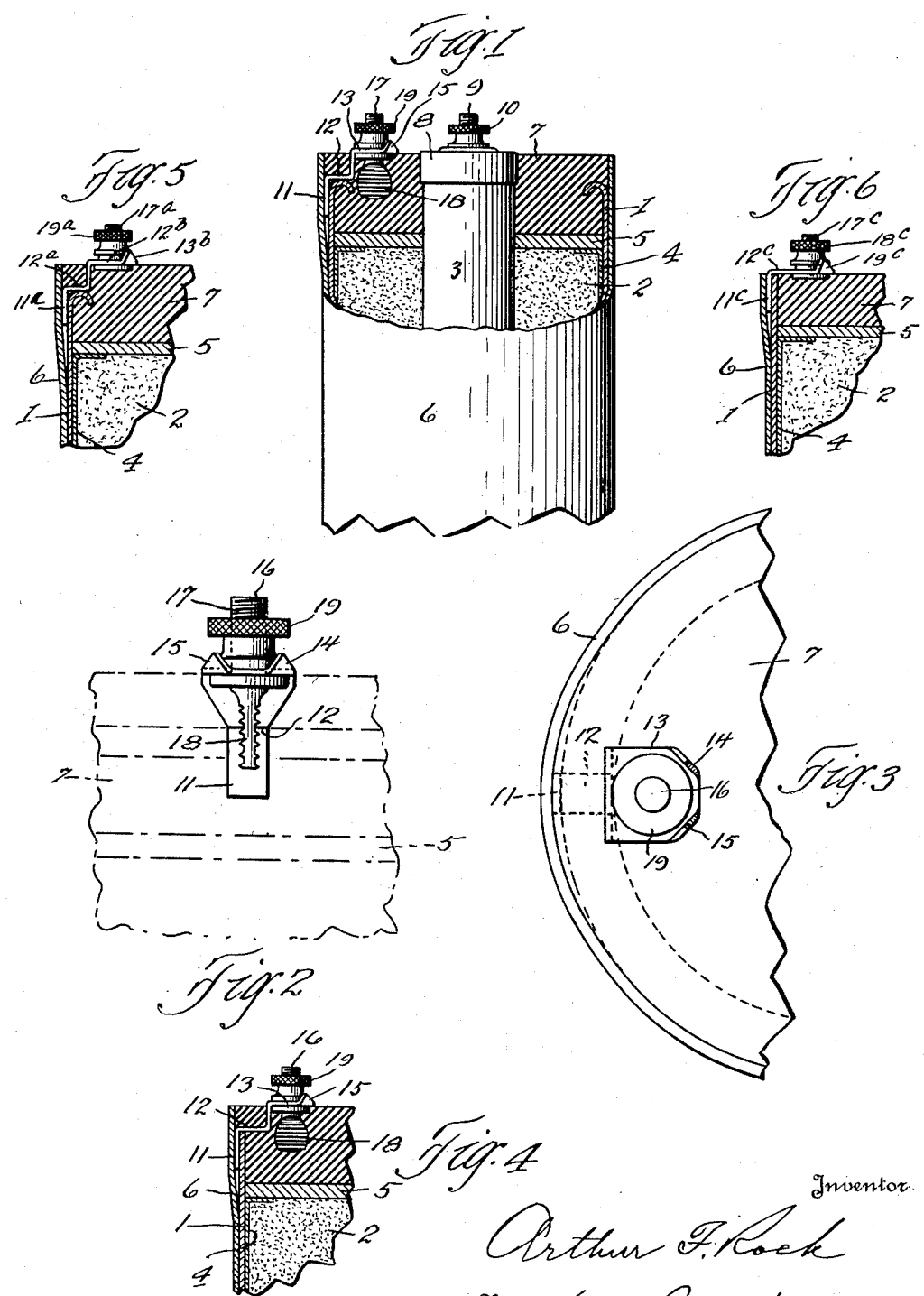

1,971,275

UNITED STATES PATENT OFFICE 1,971,275

DRY CELL AND TERMINAL THEREFOR

Arthur F. Rock, Cleveland, Ohio, assignor to General Dry Batteries, Inc., Cleveland, Ohio, a corporation of Ohio Application June 29, 1931, Serial No. 547,645

3 Claims. (Cl. 136—135)

This invention relates generally to a dry cell battery and more particularly to a negative terminal for such a battery.

The main object of the invention is to provide a terminal for dry cell batteries which is simple in construction and which is so constructed that it may be secured to the negative electrode in such a manner as to be spaced inwardly from the edge of the seal so as to reduce liability of short circuiting when two or more cells are arranged in a single package.

Another object of the invention is to provide a terminal for dry cell batteries which may be firmly secured to the negative electrode and which is provided with means for preventing rotation thereof when a connector is secured thereto.

Another object of the invention is to provide a terminal for dry cell battery units which is provided with a straight portion and a shouldered portion such that the terminal will be embedded in the seal of the cell in such a manner that rotation of the connecting element will be prevented.

A still further object of the invention is to provide a terminal for dry cell battery units which consists of a strip of metal having a straight portion adapted to be secured to the zinc electrode, and a shouldered portion which projects inwardly therefrom and through which extends a connecting member which is anchored in the seal so as to prevent rotation thereof, the inwardly directed portion having its corners or end portions bent upwardly to receive a wire therebetween whereby the wire may be secured in place with a wedging action. These turned-up corners or end portions prevent the wire connector from being squeezed out of contact when thumb screw is tightened.

Further and more limited objects of the invention will appear as the description proceeds and by reference to the accompanying drawing, in which Fig. 1 is a view, partly in side elevation and partly in vertical section, showing my improved terminal secured to a zinc electrode of a dry cell battery; Fig. 2 is a view in side elevation on an enlarged scale of my improved clip with the parts of the cell indicated in dot-and-dash lines; Fig. 3 is a fragmentary top plan view on an enlarged scale showing the clip secured to a dry cell can; Fig. 4 is a fragmentary sectional view of the clip secured to a different type of dry cell can; and Figs. 5 and 6 are fragmentary vertical sectional views illustrating a different form of negative terminal.

Referring now to the drawing, the dry cell consists of a zinc can 1 in which is arranged a mass 2 of depolarizing mix and a carbon electrode 3, which are insulated from the can by means of a lining 4 formed of some suitable material. Fitting over the carbon electrode is a washer 5. Enclosing the zinc can is a paper container or carton 6, and sealing the upper end of the can and carton is a mass of suitable sealing material 7 which interlocks with the turned-over portion of the zinc can and effectively seals the cell. Fitting over the upper end of the carbon electrode is a brass cap 8, and carried by the carbon electrode is a terminal 9 having a thumb screw 10 by means of which a connector may be secured thereto.

The negative terminal consists of a strip of metal having a straight portion 11, which is preferably soldered to the zinc can, and a shouldered portion 12 which extends inwardly from the zinc can, as shown most clearly in Fig. 1. The terminal also is provided with a horizontally disposed portion 13, the corners of which are bent upwardly, as shown at 14 and 15. The horizontally disposed portion 13 is also provided with a central opening through which extends a member 16, the upper end of which is threaded, as shown at 17, and the lower end of which is corrugated and enlarged, as shown at 18. Threadedly secured over the upper end portion of the member 17 is a thumb screw 19. When it is desired to secure a wire or connector to the terminal, the thumb screw is loosened and the wire or other connector inserted in place between the thumb screw and the turned-up portions 14 and 15. The thumb screw is then tightened to secure the connector in place with a wedging action. These turned-up end portions 14 and 15 serve to hold the connector in place and to prevent it from being squeezed out. The shouldered portions of the terminal are of such size and so proportioned that the horizontally disposed portion 13 thereof is disposed opposite the upper end of the outer carton and just slightly above the top of the seal. The enlarged portion 18 of the member 16 is embedded in the sealing material and serves to anchor the same in place and to prevent turning movement of the member 17 when the thumb screw is tightened. Due to the particular construction and shape of the terminal, the portion thereof to which the connector is secured is disposed inwardly of the zinc can so that there is no danger of short circuiting when a plurality of such cells are electrically connected in series. The terminal is firmly embedded in the seal and is not likely to become dislodged or disconnected from the zinc can when the thumb screw is tightened.

In Fig. 1 the terminal is shown as applied to a zinc can, the upper edges of which are rolled over inwardly to provide a more perfect seal for the cell. However, the same clip may be used upon a dry cell can in which the edges are not rolled over inwardly. Such a construction is shown in Fig. 4. It is also to be understood that the terminal is adapted for use with cells of all sizes and shapes. The zinc can may be either square, round or polygonal.

In Fig. 5 there is disclosed a slightly different form of negative terminal which comprises a metal clip 11ª having horizontally disposed portions 12ª and 12ᵇ the upper edges of which are turned upwardly as shown at 13ᵇ. In this form of the invention the stud or member 17 is replaced by a member 17ª which extends through the horizontally disposed portion 12ᵇ and is non-rotatably secured thereto and is adapted to receive thereover a thumb screw 19ª.

In Fig. 6 there is disclosed another form of negative terminal which consists of an L-shaped member 11ᶜ having a horizontally disposed portion 12ᶜ through which extends a threaded member or stud 17ᶜ adapted to receive thereover a thumb screw 18ᶜ. The edges of the clip adjacent said stud are bent upwardly, as shown at 19ᶜ so as to receive a connector therebetween.

In the forms of the invention disclosed in Figs. 5 and 6 a stud or member which is adapted to receive the thumb screw thereover is non-rotatably secured to the clip instead of being anchored in the seal.

It will now be clear that I have provided a terminal for dry cell batteries which will accomplish the object of the invention as hereinbefore stated.

Various changes may be made in the details of construction as well as in the shape and size of the parts without departing from the spirit of my invention. It is therefore to be understood that the embodiments of the invention herein disclosed are merely illustrative and are not to be considered in a limiting sense.

Having thus described my invention, what I claim is:

1. In a dry cell comprising a metal container and a seal, a negative terminal carried by said metal container and consisting of a clip the lower end of which is secured to said container and the upper end of which is disposed inwardly thereof, a threaded member extending through the upper end of said clip, a thumb screw threadedly secured over the upper end of said member, the edges of the upper end of said clip adjacent said thumb-screw being bent upwardly and adapted to receive a connector therebetween.

2. In a dry cell comprising a metal container and a seal, a negative terminal carried by said metal container and consisting of a clip the lower end of which is secured to said container and the upper end of which is disposed inwardly thereof, a member extending through the upper end of said clip, a thumb screw threadedly secured over said member, the edges of the upper end of said clip adjacent said thumb screw being bent upwardly and adapted to receive a connector therebetween, the upper end of said clip being horizontally disposed and positioned adjacent the surface of said seal.

3. In a dry cell comprising a metal container a mass of mix and a carbon electrode, a negative terminal rigidly secured to said metal container and comprising a metal clip the lower end of which is rigidly secured to said container and the upper end of which is disposed inwardly thereof, a stud extending through the inner end of said clip, a thumb screw threadedly secured over said stud, the edges of the upper end of said clip adjacent said thumb screw being bent upwardly and adapted to receive a connector therebetween, the inner end of said clip being horizontally disposed, and a seal closing the upper end of said container and surrounding the lower end of said stud.

ARTHUR F. ROCK.